Jan. 3, 1950  J. E. DE BAUN  2,493,477
EDUCATIONAL GAME
Filed Jan. 10, 1948

INVENTOR.
JOHN E. DE BAUN
BY
ATTORNEY

Patented Jan. 3, 1950

2,493,477

UNITED STATES PATENT OFFICE 2,493,477

EDUCATIONAL GAME

John E. De Baun, Upper Saddle River, N. J.

Application January 10, 1948, Serial No. 1,614

5 Claims. (Cl. 35—35)

This invention relates to an educational game and more particularly to a game which can be utilized to teach a child to spell, to answer questions, to learn the names of objects, to do arithmetic and to count.

The invention, in its broad sense, is a mechanical structure which can be utilized to provide many types of games and which can be utilized in many forms as an educational indicator device.

An object of the present invention is to provide a simple device provided with rotatable discs carrying symbols, such as a complete alphabet on each disc, and/or a circular row of numbers from 0 to 9, the device being provided with means such as windows whereby any selection may be made, for example, of the letters on the discs to spell a word (when the device is so intended to be used).

A further object is to provide a device as aforesaid provided with means to hold the discs at any selected position.

Another object is to provide a device as aforesaid, in which the holding means consists of teeth on the discs and a control rack bar therefore.

A further object is to provide a device as aforesaid in which the rack bar is movable by gravity.

Another object is to provide a device as aforesaid in which the movement of the rack bar by gravity is augmented by movable weights.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
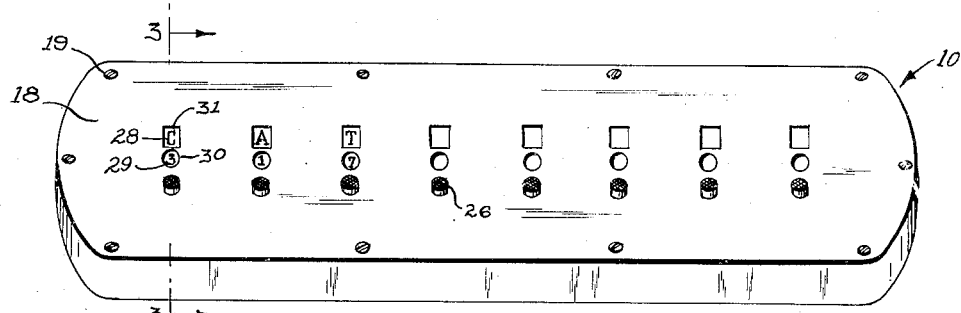
Fig. 1 is a perspective view of an educational device or game constructed in accordance with this invention.

The device of the present invention is shown in the drawings, by way of example, as a device which carries the alphabet and numbers for use in teaching a child to spell, to do arithmetic, to count, to answer questions, and for use as a game such as spelling bee game or a question and answer game. If other symbols than the alphabet and numbers are employed, the device can be adapted for other purposes. The device is indicated generally by the reference numeral 10.

The device is shown as a long, narrow, substantially box-like structure, but other shapes may be employed if desired. It includes a hollow base 11 having parallel straight front and rear walls 12 and 13 respectively, a left end wall 14, a right end wall 15 and a flat bottom wall 16. The walls 12, 13, 14 and 15 have threaded orifices 17 and a flat cover plate 18 is secured on the base by screws 19 threaded into the orifices 17.

Figure 3:
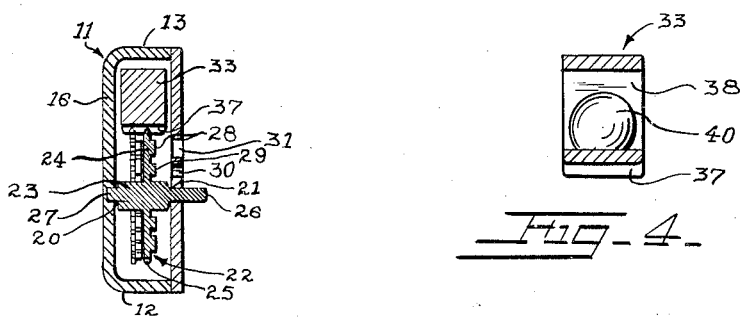
Fig. 3 is a section on the line 3—3 of Fig. 1.
Figure 4:
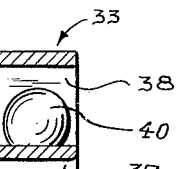
Fig. 4 is an enlarged section through the rack bar on the line 4—4 of Fig. 2.

The bottom wall 16 has a row of small circular recesses 20, see Fig. 3. In the present instance eight recesses 20 are employed and the cover 18 has eight larger orifices 21 in line therewith so that eight overlapping discs 22 can be mounted for rotation in the base 11. Each disc has a hub 23 of larger diameter than the orifice 21, a circular plate 24 radiating from the hub and having teeth 25 in its periphery. A knob 26 extends from each of the hubs 23 through the orifices 21, and a pin 27 extending from each of the hubs into one of the recesses 20. On the front face of each of the plates 24 there is a circular row of embossed letters 28 and a smaller and radially inner circular row of embossed numbers 29. The letters 28 will extend from A to Z with a blank space between Z and A. The numbers 29 will extend from 0 to 9 with a blank space between 9 and 0, the blank spaces being in line. The entire disc is preferably cast or molded as one integral piece of plastic.

The base and cover are also preferably of plastic. The cover has a window 30 for the numbers 29 and a window 31 for the letters 28 vertically in line with its orifice 21. The discs are offset in the base, providing a long narrow space 32 above the discs.

Figure 2:
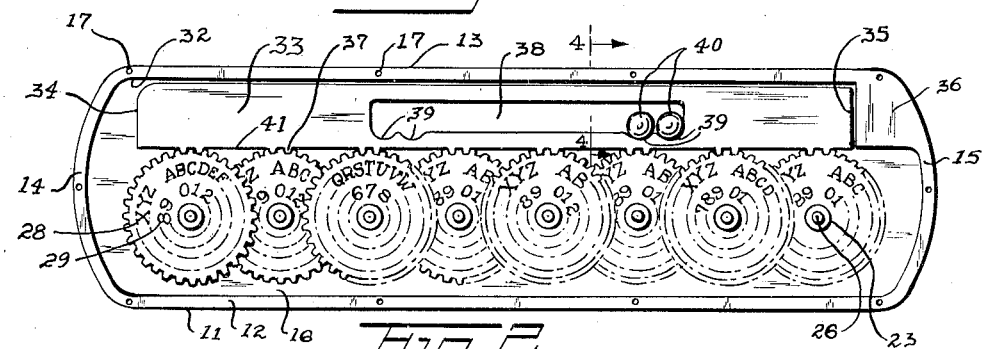
Fig. 2 is a plan view of the device with the front plate removed.
Figure 5:
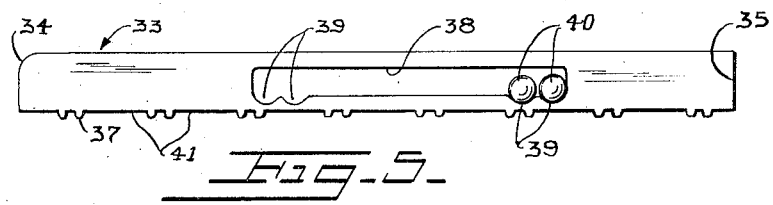
Fig. 5 is a side view of the rack bar.

A floating rack bar 33, which is also preferably of plastic, is slidably disposed in the space 32. The rack bar has a left end 34 curved similarly to opposite portion of the wall 14 and a right end 35 which is square for engaging an abutment 36 formed integral with the wall 15. The rack bar 33 has eight sets of depending teeth 37, there being preferably two teeth in each set. When the bar is all the way to the right, as shown in Fig. 2, the rack teeth 37 will be in line with the vertical center lines of the plates 24 and engaged with the uppermost two teeth 25 thereof, as will later be described. The rack bar further has a long slot 38, open through its top and bottom and provided at each of its ends with two seats 39 for receiving two balls 40. The balls 40 are preferably heavy, such as lead buckshot balls.

The operation of the device is as follows:

Assume that a teacher wishes to teach a child to spell "Cat." She will ask the child to do this, and will use the device as an incentive and as a visual aid to teach the child. Assuming that all of the discs are in a position where no letters and no numbers show through the windows 30 and 31, and the rack is at the left, she will turn the first three knobs to turn the letters C-A-T in line with the first three windows 31, see Fig. 1. Numbers will also appear in their windows 30, but these will be ignored. She will want to leave "Cat" visible until the child can spell it accurately which, for a very small child, might be a day's lesson.

To hold "Cat" in place and to prevent other letters from inadvertently being moved into a position in front of a window, the device is provided with the rack bar locking means. To put this into operative position, the teacher turns the device so that the rack bar is at the bottom. It will fall into engagement with the wall 13 and its teeth 37 will thus be spaced from the teeth of the discs. The balls 40 will augment the weight of the bar, making sure that it falls to the wall 13. The teacher will then tip the device so that wall 14 is above wall 15, causing the balls 40 to roll to the right end of the rack bar slot 38. The weight of the rack bar will tend to move it downhill toward wall 15 and the force of the balls rolling and hitting the right end of the slot 38 will overcome the friction of the engagement of the rack bar 33 with the wall 13, and the rack bar will move until its end 35 engages the abutment 36. The teacher will then turn the device so that it sets on its walls 12 in vertical position. The rack bar 33 will then fall vertically toward the discs, being guided by the square surfaces of the end 35 and the abutment 36, the balls 40 augmenting this falling, and the teeth 37 will lock with the teeth 25 of the plates 24, holding all of the plates in their adjusted position, that is, with the first three plates spelling the word "Cat" and the remaining five plates showing blank spaces at their windows.

The rack bar slides with working clearance between the bottom wall 16 and the cover plate 18 and these guide the rack bar and retain the balls 40 in the slot 38. When the rack bar is at the right, the balls 40 are in one set of seats 39. When the rack bar is at the left, the balls are in the other set of seats 39. The teeth 37 are separated by recesses 41. When the rack bar is at the left with its end 34 abutting the end wall 14, the toothed edges of the discs engage the flat surfaces of the recesses 41 and are free to be rotated. The rack bar, when it is in locking position, can be freed either by tilting the device so that end wall 14 drops below wall 15 or one of the knobs 26 can be turned to move the rack bar to the left until it unlocks the discs.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described by invention, what I claim as new, and desire to secure by United States Letters Patent, is:

1. In an educational game having a hollow casing including a flat bottom wall, a rear wall and a removably mounted cover plate with a row of circular plates rotatively supported between the bottom wall and the cover plate and provided on their faces adjacent the cover plate with circular rows of indicia visible through openings formed in the cover plate in the various rotative positions of the plates, means contained entirely within the casing for locking the plates in desired rotative positions in which desired indicia will be aligned with the openings, comprising a floating rack bar in the casing between the rear wall and the adjacent sides of the plates to move longitudinally and laterally of the casing, rack teeth formed about the periphery of the plates, and spaced sets of rack teeth one set for each of the plates formed along the edge portion of said rack bar adjacent the plates and engageable with the rack teeth of the plates in certain longitudinal shifted positions of said rack bar to retain the plates against accidental movement.

2. In an educational game having a hollow casing including a flat bottom wall, a rear wall and a removably mounted cover plate with a row of circular plates rotatively supported between the bottom wall and the cover plate and provided on their faces adjacent the cover plate with circular rows of indicia visible through openings formed in the cover plate in the various rotative positions of the plates, means contained entirely within the casing for locking the plates in desired rotative positions in which desired indicia will be aligned with the openings, comprising a floating rack bar in the casing between the rear wall and the adjacent sides of the plates to move longitudinally and laterally of the casing, rack teeth formed about the periphery of the plates, and spaced sets of rack teeth one set for each of the plates formed along the edge portion of said rack bar adjacent the plates and engageable with the rack teeth of the plates in certain longitudinal shifted positions of said rack bar to retain the plates against accidental movement, and means weighting said rack bar to cause it to move in response to turning movements of the casing between an operative position in which the sets of rack teeth engage the rack teeth of the plates and an inoperative position in which the sets of rack teeth are disengaged from the rack teeth of the plates.

3. In an educational game having a hollow casing including a flat bottom wall, a rear wall and a removably mounted cover plate with a row of circular plates rotatively supported between the bottom wall and the cover plate and provided on their faces adjacent the cover plate with circular rows of indicia visible through openings formed in the cover plate in the various rotative positions of the plates, means contained entirely within the casing for locking the plates in desired rotative positions in which desired indicia will be aligned with the openings, comprising a floating rack bar in the casing between the rear wall and the adjacent sides of the plates to move longitudinally and laterally of the casing, rack teeth formed about the periphery of the plates, and spaced sets of rack teeth one set for each of the plates formed along the edge portion of said rack bar adjacent the plates and engageable with the rack teeth of the plates in certain longitudinal shifted positions of said rack bar to retain the plates against accidental movement, and means weighting said rack bar to cause it to move in response to turning movements of the casing between an operative position in which the sets of rack teeth engage the rack teeth of the plates and an inoperative position in which the sets of rack teeth are disengaged from the rack teeth of the plates, said rack bar being formed with an elongated slot intermediate of its ends, and a pair of balls in said slot forming said weighting means, said rack bar being only slightly thinner than the space between the adjacent faces of the bottom wall and the cover plate to retain said balls in position in said slot.

4. In an educational game having a hollow casing including a flat bottom wall, a rear wall and a removably mounted cover plate with a row of circular plates rotatively supported between the bottom wall and the cover plate and provided on their faces adjacent the cover plate with circular rows of indicia visible through openings formed in the cover plate in the various rotative positions of the plates, means contained entirely within the casing for locking the plates in desired rotative positions in which desired indicia will be aligned with the openings, comprising a floating rack bar in the casing between the rear wall and the adjacent sides of the plates to move longitudinally and laterally of the casing, rack teeth formed about the periphery of the plates, and spaced sets of rack teeth one set for each of the plates formed along the edge portion of said rack bar adjacent the plates and engageable with the rack teeth of the plates in certain longitudinal shifted positions of said rack bar to retain the plates against accidental movement, and means weighting said rack bar to cause it to move in response to turning movements of the casing between an operative position in which the sets of rack teeth engage the rack teeth of the plates and an inoperative position in which the sets of rack teeth are disengaged from the rack teeth of the plates, said rack bar being formed with an elongated slot intermediate of its ends, and a pair of balls in said slot forming said weighting means, said rack bar being only slightly thinner than the space between the adjacent faces of the bottom wall and the cover plate to retain said balls in position in said slot, and seats for said balls formed at the ends of said slots on the side thereof adjacent the plates.

5. In an educational game having a hollow casing including a flat bottom wall, a rear wall and a removably mounted cover plate with a row of circular plates rotatively supported between the bottom wall and the cover plate and provided on their faces adjacent the cover plate with circular rows of indicia visible through openings formed in the cover plate in the various rotative positions of the plates, means contained entirely within the casing for locking the plates in desired rotative positions in which desired indicia will be aligned with the openings, comprising a floating rack bar in the casing between the rear wall and the adjacent sides of the plates to move longitudinally and laterally of the casing, rack teeth formed about the periphery of the plates, and spaced sets of rack teeth one set for each of the plates formed along the edge portion of said rack bar adjacent the plates and engageable with the rack teeth of the plates in certain longitudinal shifted positions of said rack bar to retain the plates against accidental movement, and an abutment formed within the casing in alignment with said rack bar to be engaged by the adjacent end of the rack bar when moved longitudinally toward said abutment and when said sets of rack teeth are in operative alignment with the rack teeth of the plate.

JOHN E. DE BAUN.

REFERENCES CITED

The following references are of record in the file of this patent:

UNITED STATES PATENTS

| Number | Name | Date |
| --- | --- | --- |
| 554,712 | Morrison | Feb. 18, 1896 |
| 1,581,374 | Youngs | Apr. 20, 1926 |
| 1,651,033 | McClellan et al. | Nov. 29, 1927 |
| 1,752,766 | Vethe | Apr. 1, 1930 |